Oct. 29, 1957     F. B. WOESTEMEYER     2,811,344
ACCELERATION RESPONSIVE SYSTEM
Filed Jan. 3, 1955
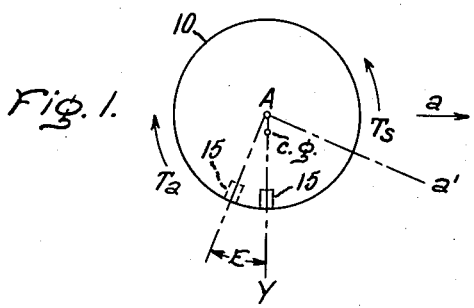
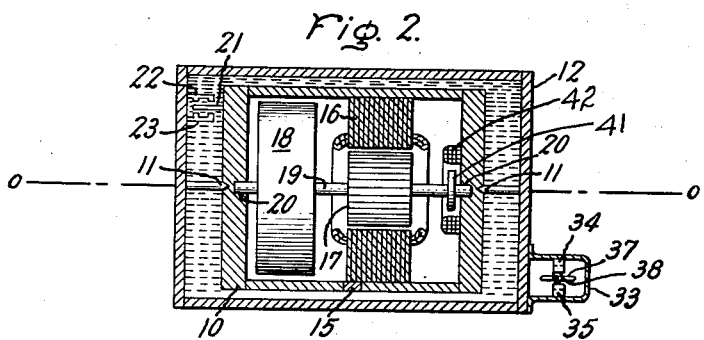
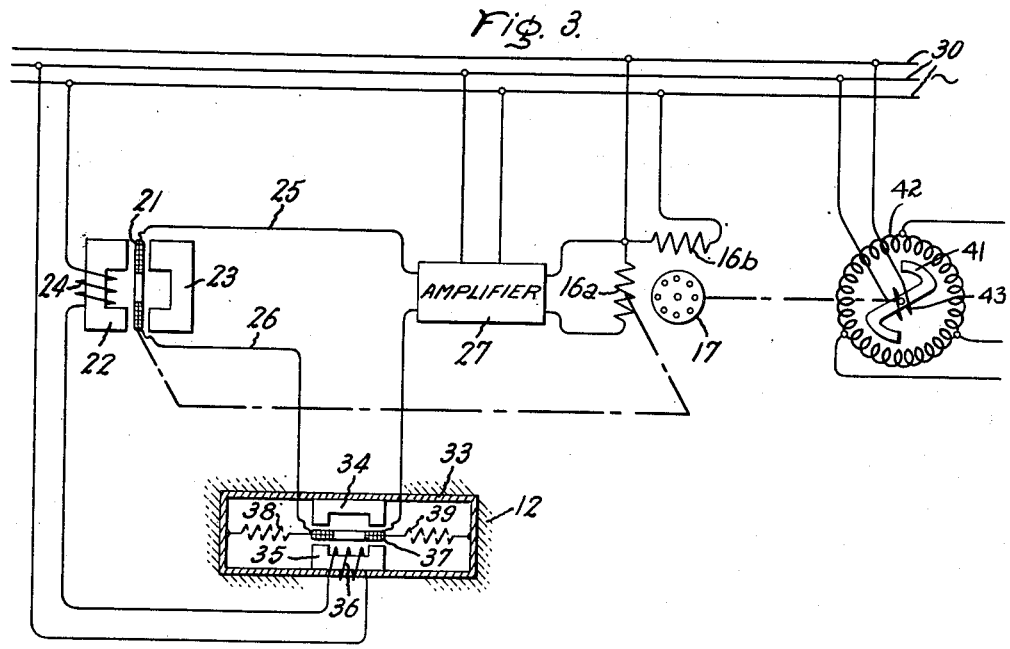
Inventor:
Francis B. Woestemeyer,
by [signature]
His Attorney.

United States Patent Office 2,811,344
Patented Oct. 29, 1957

2,811,344

ACCELERATION RESPONSIVE SYSTEM

Francis B. Woestemeyer, Schenectady, N. Y., assignor to General Electric Company, a corporation of New York Application January 3, 1955, Serial No. 479,406

4 Claims. (Cl. 264—1)

This invention relates to an acceleration responsive system including a device having a rotatably mounted acceleration responsive element and has for its object the provision of such a system in which the response of the device is controlled so that it is responsive only to desired accelerations.

The present invention constitutes an improvement on acceleration responsive devices of the type having the acceleration responsive element rotatably mounted. One device of this type is disclosed in a copending application of Frithiof V. Johnson, entitled "Acceleration Responsive Device," Serial No. 419,909, filed October 4, 1954, and assigned to the assignee of the present invention.

In the Johnson application referred to above, which is discussed here for illustrative purposes, there is provided an acceleration responsive device having an acceleration responsive element pivotally mounted for free rotation, and having an unbalance mass eccentrically mounted on the acceleration responsive element so as to unbalance the element whereby a torque is imparted to the unbalanced element in response to linear accelerations with resulting angular movement of the unbalanced element. A servo system responsive to this angular movement of the unbalanced element imparts a counter-torque thereto tending to restore the element to the original position. When devices of this type are mounted in vehicles, particularly guided missiles, they are, on occasion, subject to error caused by the shifting of the sensitive axis of the unbalanced element away from the direction in which it is desired to measure accelerations. Thus, as may be seen by reference to Fig. 1, if the acceleration desired to be measured is in the direction "a," then before rotation of the element 10 about its axis accelerations in a direction perpendicular to the desired measuring direction, e. g. along AY, have no effect on the device since they act through the center of gravity of the unbalanced element. However, when the rotatable unbalanced acceleration responsive element, in responding to acceleration in the direction "a," rotates in a clockwise direction through a small angle E due to the inertia of the mass 15 and the consequent torque Ta, there is an accompanying shift in the sensitive axis of the device to a'. Rotation of the element also changes the position of the mass 15 and renders the mass and therefore the unbalanced element sensitive to unwanted lateral accelerations, e. g. acting along AY, and introduces error in the measurement of acceleration in the "a" direction. A servo system of the simple type currently used can never reduce E to zero by a restoring torque Ts since the servo system requires an error signal to produce the counter-torque and provide the acceleration measuring function.

One method which can be used to reduce the shift of the sensitive axis of the device is to design the servo with high loop gain so as to maintain the acceleration responsive element at its original or null position within a very small range of servo error. Such a design is somewhat more difficult and allows less design flexibility than a lower gain servo. In addition, the high gain servo design makes the servo sensitive to unwanted high frequency accelerations such as may result from vehicle vibrations or oscillations, thus introducing further difficult problems of servo designs and leading to additional errors into the acceleration measuring system. In many applications the servo gain required to decrease the response to accelerations in undesired directions is much greater than that necessary to measure the desired accelerations with the required accuracy.

Thus, an object of the present invention is to provide an acceleration responsive device of the type described having a low gain servo and yet limiting the movement of the acceleration responsive element to small angles in order to avoid response to unwanted accelerations.

Briefly stated in accordance with one aspect of this invention, there is provided an acceleration responsive system including a device having an acceleration responsive element rotatably mounted, means for unbalancing the element whereby a torque is imparted thereto in response to accelerations, and pickoff means for producing a first voltage signal in response to movement caused by this torque. There is also provided an auxiliary accelerometer for producing a voltage signal in response to accelerations desired to be measured, and circuit means for adding the first and second voltage signals together. Restoring means are provided responsive to this added voltage signal for imparting a counter-torque to the acceleration responsive element to restore it to its original position. The auxiliary accelerometer may be selected so that its output voltage signal is of the magnitude to provide the restoring signal to the restoring means, thereby insuring limited movement of the acceleration responsive element.

The invention will be better understood and additional objects and advantages thereof will become apparent upon perusal of the following description taken in connection with the drawing, and the scope of the invention will be pointed out in the appended claims.

In the drawing:

Fig. 1 is a diagrammatic sketch of the acceleration responsive element showing the shifting of the sensitive axis without the use of the present invention.

Fig. 2 is a view in section of an acceleration responsive system illustrating the present invention.

Fig. 3 is a circuit diagram of the electrical connections of the device shown in Fig. 2 and further including the auxiliary accelerometer.

Referring more particularly to the drawing, an acceleration responsive device is provided having an acceleration responsive element rotatably mounted. As illustrated this element comprises a hollow container 10 pivotally mounted by bearing means 11 for rotation about an axis O—O. The bearing means 11 are mounted within a housing 12 which is fixed with respect to the member whose acceleration is to be measured.

Means are provided for unbalancing the acceleration responsive element whereby a torque is imparted thereto in response to accelerations desired to be measured. The illustrated form of this means is an unbalance mass 15 mounted eccentrically in the container 10 and serving to make the center of gravity of the container 10 displaced from its axis of rotation.

Pickoff means are provided for producing a first voltage signal in response to movement caused by the torque described above. This pickoff means is in the form of a movable coil 21, which is fixed on the container 10 and moves with the container within the air gap of a closed magnetic circuit made up of magnetizable members 22 and 23 mounted on the inside of the housing 12 and energized by a coil 24.

An auxiliary accelerometer is provided for producing a second voltage signal in response to accelerations desired to be measured. This auxiliary accelerometer may be of a commercially available type and for purposes of this disclosure such an accelerometer is schematically shown. Fixedly mounted on the housing 12 is such an auxiliary accelerometer casing 33 including a pair of magnetizable members 34 and 35 energized by a coil 36 to form a magnetic circuit. A coil 37 is disposed in the air gap defined by members 34 and 35 and is spring-centered by springs 38 and 39 also fixed on the casing 33. In response to accelerations in the direction "a," or the direction of the accelerations desired to be measured, the coil 37 moves from the spring-centered position. Movement of the coil 37 with respect to the magnetizable members 34 and 35, induces a voltage signal within the coil 37, which is herein referred to as a second voltage signal.

Circuit means are provided for adding the voltage signals produced within the coil 21 and the coil 37. This circuit means is in the form of conductors 25 and 26 connecting the coils 21 and 37 in series, thereby adding the voltage signals therefrom.

Restoring means are provided responsive to this added voltage signal for imparting a counter-torque to the acceleration responsive element to restore it to its original position. This means in the illustrated embodiment is in the form of a closed loop servo system including an electric motor mounted within the container 10, including a stator 16, a rotor 17, and a flywheel 18, mounted on the rotor shaft 19. The shaft 19 is mounted for rotation by bearing means in the form of journals 20 provided in the container 10. This restoring means also includes a circuit connecting the conductors 25 and 26 through an amplifier 27 to one phase 16a of the stator 16 of the two phase motor. The other phase 16b of the stator 16 is connected to a suitable A. C. power source 30 and the power for the amplifier 27 and for energizing the pickoff coil 24 and the coil 36 is also obtained from the source 30. Flexible connectors, suitably insulated (not shown in Figs. 2 or 3), are used to transmit power and signals between the container 10 and the housing 12 in accordance with the circuit shown in Fig. 3. The added voltage signal is applied to the motor so that the rotation of the rotor and the flywheel will be in the same direction as the torque imparted to the container by the accelerations being measured, whereby the reaction torque on the stator will be in the opposite direction, acting to return the container to the original or null position.

The acceleration of the motor rotor 17 and the flywheel 18 is proportional to the linear acceleration to which the device is subjected as is described more fully in the above-mentioned Johnson application. Thus, a measure of acceleration can be obtained with minimum angular movement of the unbalanced element and with minimum error caused by shifting of the sensitive axis of the device away from the desired measuring direction.

In operation when the system is subjected to acceleration in the desired measuring direction, if the auxiliary accelerometer voltage signal is exactly the right magnitude needed by the servo system to produce the proper counter-torque to maintain the unbalanced element at its original position, the servo amplifier will have its necessary input without requiring the container 10, that is, the unbalanced acceleration responsive element, to move at all. If the auxiliary accelerometer signal is not exactly the right magnitude, then the container 10 will rotate until the voltage signal from its own pickoff coil 21 plus the voltage signal from the auxiliary accelerometer coil 37 gives the necessary signal. In this fashion, it is possible to decrease the gain of the servo system since the only motion of the acceleration responsive element will be that which is necessary to correct for inaccuracies in the auxiliary accelerometer. The net result is a low gain servo which nevertheless has a small pickoff output voltage signal with resultant small motion of the acceleration responsive element, since most of the error signal for the servo is provided from the auxiliary accelerometer.

Means are provided for obtaining a signal proportional to the displacement of the rotor 17 with respect to the container 10. In the illustrated embodiment, this means is in the form of a selsyn mounted within the container 10 and comprising a rotary member 41 mounted on the shaft 19, and a field winding 42 mounted in the container 10. The energizing winding 43 (Fig. 3) for the rotor of the selsyn receives power from the source 30. The output voltage from the field 42 of the selsyn may be used as a control signal in the energization of an autopilot used in the actuation of the control surface of the aircraft or missile in which the acceleration responsive device of this invention is used. An example of such an autopilot may be seen in U. S. Patent 2,416,097 to Hensen, Jewell, Johnson, and Porter.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by United States Letters Patent is:

1. An acceleration responsive system including a device having an acceleration responsive element rotatably mounted, means for unbalancing said element whereby a torque is imparted thereto in response to acceleration desired to be measured, pickoff means for producing a first voltage signal in response to movement caused by said torque, an auxiliary accelerometer for producing a second voltage signal in response to acceleration desired to be measured, circuit means for adding said voltage signals, restoring means responsive to said added voltage signal for imparting a counter-torque to said element tending to restore it to its original position and reduce said added voltage signal.

2. An acceleration responsive system as set forth in claim 1, said auxiliary accelerometer being so constructed and arranged that the second voltage signal is of the magnitude required to produce a torque which is substantially equal and opposite to that acting on the acceleration responsive element when it is subjected to acceleration, thereby permitting the first voltage signal to be substantially zero and the rotation of said element to be substantially zero.

3. An acceleration responsive system comprising a housing adapted for mounting in an aircraft, an acceleration responsive element rotatably mounted in said housing, said element having its center of gravity displaced from its center of rotation to unbalance the element so that a torque is imparted thereto in response to acceleration, pickoff means for producing a first voltage signal in response to movement caused by said torque, an auxiliary accelerometer mounted on said housing and oriented so as to produce a second voltage signal in response to acceleration in the same direction as that producing said torque, circuit means for adding said voltage signals, restoring means responsive to said added voltage signal for imparting a counter-torque to said element tending to restore it to its original position and reduce said added voltage signal.

4. A system as set forth in claim 3, said auxiliary accelerometer comprising magnetizable members fixed with respect to said housing and defining an air gap therebetween, a coil disposed within the air gap and being spring-centered therein by springs secured to said housing, said springs permitting movement of the coil in the direction of acceleration desired to be measured.

No references cited.